United States Patent
Yoneda et al.

(10) Patent No.: US 11,323,323 B2
(45) Date of Patent: May 3, 2022

(54) COMMUNICATION SYSTEM, COMMUNICATION APPARATUS, AND COMMUNICATION METHOD

(71) Applicant: OMRON Corporation, Kyoto (JP)

(72) Inventors: Mitsuhiro Yoneda, Tenri (JP); Shigenori Sawada, Takatsuki (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/642,020

(22) PCT Filed: Oct. 1, 2018

(86) PCT No.: PCT/JP2018/036667
§ 371 (c)(1),
(2) Date: Feb. 26, 2020

(87) PCT Pub. No.: WO2019/069845
PCT Pub. Date: Apr. 11, 2019

(65) Prior Publication Data
US 2020/0186420 A1   Jun. 11, 2020

(30) Foreign Application Priority Data
Oct. 5, 2017 (JP) .............................. JP2017-195328

(51) Int. Cl.
*H04L 41/0816* (2022.01)
*H04L 41/0893* (2022.01)
*H04L 69/28* (2022.01)

(52) U.S. Cl.
CPC ...... *H04L 41/0816* (2013.01); *H04L 41/0893* (2013.01); *H04L 69/28* (2013.01)

(58) Field of Classification Search
CPC ............................ H04L 45/302; H04L 45/306
See application file for complete search history.

(56) References Cited

U.S. PATENT DOCUMENTS

| 2003/0086422 A1* | 5/2003 | Klinker ................. H04L 29/06 370/389 |
| 2006/0038688 A1* | 2/2006 | Nakamura ........... G06Q 10/063 340/573.1 |

(Continued)

FOREIGN PATENT DOCUMENTS

| JP | 2014-016753 A | 1/2014 |
| JP | 2015-508950 A | 3/2015 |

(Continued)

OTHER PUBLICATIONS

English translation of the International Search Report("ISR") of PCT/JP2018/036667 dated Dec. 18, 2018.

(Continued)

*Primary Examiner* — Kevin T Bates
*Assistant Examiner* — Emad Siddiqi
(74) *Attorney, Agent, or Firm* — Metrolex IP Law Group, PLLC

(57) ABSTRACT

A rule for transferring data over a communication network is changed for each communication apparatus without spending time and cost. In a communication system in which a plurality of communication apparatuses are connected to a network, at least one of the plurality of communication apparatuses includes rule storage means for storing a plurality of transfer rules for transferring data over the network, transfer means for transferring data incoming over the network in accordance with one of the plurality of transfer rules, and rule switching means for switching one transfer rule to another transfer rule when the communication apparatus receives a notification from the outside.

15 Claims, 12 Drawing Sheets

(56) References Cited

U.S. PATENT DOCUMENTS

| | | | |
|---|---|---|---|
| 2013/0142196 A1 | 6/2013 | Cors et al. | |
| 2015/0222483 A1 | 8/2015 | Koide | |
| 2015/0295410 A1* | 10/2015 | Hooshmand | G06Q 10/063 307/20 |
| 2015/0304216 A1* | 10/2015 | Suzuki | H04L 45/48 370/390 |
| 2017/0026292 A1* | 1/2017 | Smith | H04L 43/16 |
| 2017/0048131 A1* | 2/2017 | Walker | H04L 45/02 |
| 2019/0121335 A1* | 4/2019 | Yoneda | G05B 19/4185 |
| 2020/0036786 A1* | 1/2020 | Yoneda | H04L 29/06 |
| 2020/0099626 A1* | 3/2020 | Yoneda | H04L 49/251 |
| 2020/0119975 A1* | 4/2020 | Yoneda | H04L 67/125 |

FOREIGN PATENT DOCUMENTS

| | | |
|---|---|---|
| JP | 2015-532018 A | 11/2015 |
| JP | 2017-175462 A | 9/2017 |
| WO | 2017067578 A1 | 4/2017 |

OTHER PUBLICATIONS

The Written Opinion("WO") of PCT/JP2018/036667 dated Dec. 18, 2018.
The extended European search report (EESR) dated May 21, 2021 in a counterpart European patent application.

* cited by examiner

FIG.6

| STREAM ID (51) | DATA SIZE (52) | CYCLE (53) | SENDER (TALKER) (54) | DESTINATION (LISTENER) (55) | DELAY TIME (LATENCY) (56) | |
|---|---|---|---|---|---|---|
| FLow1 | 64 | 1ms | TL1 | TL2 | 100MS | |
| FLow2 | 64 | 1ms | TL2 | TL1 | 100MS | |
| ⋮ | ⋮ | ⋮ | ⋮ | ⋮ | ⋮ | ⋮ |

57 spans columns 54-56. Table labeled 50A/50B.

FIG.7

| PORT 1 | PORT 2 | TRANSFER RULE |
|---|---|---|
| L → H | L | RULE 「A」 |
| L | L → H | RULE 「B」 |

62 spans PORT 1 and PORT 2; 63 is TRANSFER RULE; table 60.

| SENDER (TALKER) | DESTINATION (LISTENER) | OUTPUT PORT | PRIORITY | GATE TIME PERIOD |
|---|---|---|---|---|
| A2 | C1 | PORT 1 | 1 | ·· |
| D | D1 | PORT 1 | 2 | ·· |
| C2 | B1 | PORT 1 | 3 | ·· |
| A2 | B | PORT 2 | 1 | ·· |
| D2 | D | PORT 2 | 2 | ·· |
| C1 | C | PORT 2 | 3 | ·· |
| D1 | C | PORT 2 | 1 | ·· |
| C1 | D | PORT 2 | 2 | ·· |
| B1 | B | PORT 2 | 3 | ·· | ized networked has been on the way of implementation also for production lines.

COMMUNICATION SYSTEM, COMMUNICATION APPARATUS, AND COMMUNICATION METHOD

TECHNICAL FIELD

The present disclosure relates to a communication system in which a plurality of communication apparatuses are connected to a network, a communication apparatus, and a communication method therefor.

BACKGROUND ART

With recent development of information and communication technology (ICT), such a control system that everything from manufacturing equipment at a site to a higher-order management apparatus is integrally networked has been on the way of implementation also for production lines.

For example, Japanese Patent Laying-Open No. 2014-16753 (PTL 1) discloses a setting support system that readily performs an equipment setting operation in a factory automation (FA) network system. Specifically, the setting support system includes an FA network system in which a plurality of pieces of equipment and a programmable logic controller (PLC) that controls each piece of equipment are connected over a network and a support apparatus that supports setting of each piece of equipment connected to the FA network system. Each piece of equipment stores profile information representing specifications of definition information that defines an operation by the equipment itself, and the support apparatus obtains the profile information from each piece of equipment and associates the equipment and the profile information with each other in network configuration information.

CITATION LIST

Patent Literature

PTL 1: Japanese Patent Laying-Open No. 2014-16753

SUMMARY OF INVENTION

Technical Problem

A scheme for associating equipment and the profile information with each other in the network configuration information in PTL 1 is on the premise that equipment connected to the FA network system is not changed during operation. Therefore, for example, when equipment connected to the FA network system is changed due to changeover in production lines, in the setting support system in PTL 1, for example, a user should perform an operation to change a rule for transferring data such as network configuration information held by the support apparatus to contents adapted to the changed configuration.

Therefore, a communication system in which a rule for transferring data held by each communication apparatus over a communication network can readily be changed has been demanded.

Solution to Problem

A communication system according to one example of the present disclosure is a communication system in which a plurality of communication apparatuses are connected to a network, and at least one of the plurality of communication apparatuses includes rule storage means for storing a plurality of transfer rules for transferring data over the network, transfer means for transferring data incoming over the network in accordance with one transfer rule of the plurality of transfer rules, and rule switching means for switching the one transfer rule to another transfer rule when the communication apparatus receives a notification from the outside.

According to the disclosure, the communication apparatus stores a plurality of transfer rules in advance and the rule switching means switches one current transfer rule to another transfer rule when the communication apparatus receives a notification from the outside. The rule for transferring data over a communication network can thus flexibly be changed without spending time and cost.

In the disclosure described above, the plurality of communication apparatuses are in time synchronization with one another, and the notification includes information on time of switching of the one transfer rule to another transfer rule.

According to the disclosure, the communication apparatuses are in time synchronization with one another so that time to switch the transfer rule can match among them.

In the disclosure described above, the notification includes information representing a transfer rule to be switched to. According to the disclosure, the transfer rule to be switched to can match among the communication apparatuses.

In the disclosure described above, when a network configuration representing a manner of connection of the plurality of communication apparatuses over the network is changed, the notification is transmitted to the network.

According to the disclosure, when the network configuration is changed, the transfer rule can be switched in each communication apparatus.

In the disclosure described above, when change in network configuration is detected, another communication apparatus of the plurality of communication apparatuses broadcasts the notification over the network.

According to the disclosure, when change in network configuration is detected, the notification is broadcast so that the notification can reliably be transmitted to all communication apparatuses.

In the disclosure described above, the transfer rule includes a path rule for setting a transmission path in the network for transferring the incoming data to another communication apparatus.

According to the disclosure, setting of a path for transmission of data can be changed in accordance with change in network configuration.

In the disclosure described above, the communication apparatus further includes a plurality of ports from which the incoming data is sent to the network, the plurality of ports correspond to the plurality of transmission paths, and the path rule includes a rule that identifies one of the plurality of ports based on a sender and a destination of the incoming data.

According to the disclosure, the communication apparatus can change the data transmission path in accordance with change in network configuration. Such change can be made simply by identifying one of the plurality of ports based on a sender and a destination of incoming data.

In the disclosure described above, the transfer rule includes a band rule for setting a communication band in which the data is to be transmitted, in a communication band of the network.

According to the disclosure, the communication apparatus can change a data transmission band in accordance with change in network configuration.

In the disclosure described above, the network includes a network over which data for controlling a manufacturing apparatus or a production facility is transmitted, and the band rule includes a rule for securing a communication band for the data, in the communication band of the network.

According to the disclosure, even though the transfer rule is switched, a communication band for data for controlling a manufacturing apparatus or a production facility can be secured and reliability in control of the manufacturing apparatus or the production facility is not compromised.

A communication apparatus according to another example of the present disclosure is a communication apparatus connected to a communication system over a network, and the communication apparatus includes rule storage means for storing a plurality of transfer rules for transferring data to another communication apparatus over the network, transfer means for transferring data incoming over the network in accordance with one transfer rule of the plurality of transfer rules, and rule switching means for switching the one transfer rule to another transfer rule when the communication apparatus receives a notification from the outside.

According to the disclosure, the communication apparatus stores a plurality of transfer rules in advance and the rule switching means switches one current transfer rule to another transfer rule when the communication apparatus receives a notification from the outside. The rule for transferring data over the communication network can thus flexibly be changed without spending time and cost.

A communication method according to yet another example of the present disclosure is a communication method in a communication system in which a plurality of communication apparatuses are connected to a network, and the communication method includes, by at least one of the plurality of communication apparatuses, transferring data incoming over the network in accordance with one transfer rule of a plurality of transfer rules for transferring data over the network and switching the one transfer rule to another transfer rule when the communication apparatus receives a notification from the outside.

According to the disclosure, the communication apparatus stores a plurality of transfer rules in advance and the rule switching means switches one current transfer rule to another transfer rule when the communication apparatus receives a notification from the outside. The rule for transferring data over the communication network can thus flexibly be changed without spending time and cost.

Advantageous Effects of Invention

According to one example of the present disclosure, a rule for transferring data over a communication network can be changed for each communication apparatus without spending time and cost.

BRIEF DESCRIPTION OF DRAWINGS

FIG. 6 is a diagram schematically showing an exemplary communication requirement according to the present embodiment.

FIG. 7 is a diagram schematically showing an exemplary change detection rule according to the present embodiment.

DESCRIPTION OF EMBODIMENTS

Figure 1:
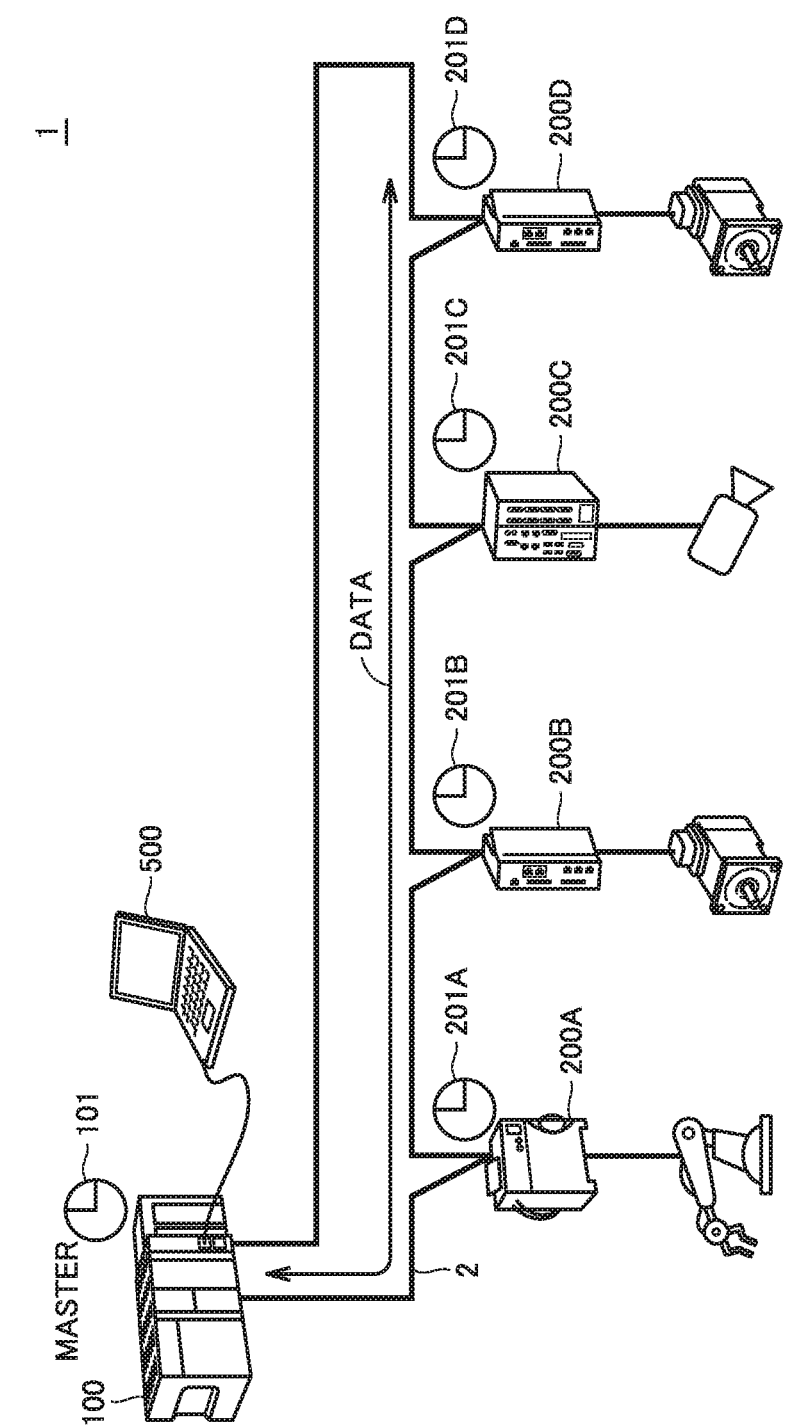
FIG. 1 is a diagram schematically showing a configuration of a communication system according to the present embodiment.

Each present embodiment according to the present invention will be described below with reference to the drawings. In the description below, the same elements and components have the same reference characters allotted and their labels and functions are also the same. Therefore, detailed description thereof will not be repeated. Each present embodiment and each modification described below may selectively be combined as appropriate.

<A. Application>

An exemplary scene where the present invention is applied will initially be described with reference to FIG. 1. FIG. 1 is a diagram schematically showing a configuration of a communication system 1 according to the present embodiment.

Communication system 1 according to the present embodiment is a communication system in which a plurality of communication apparatuses (a control device 100 and devices 200A to 200D) are connected to a network 2, and at least one of the plurality of communication apparatuses includes rule storage means for storing a plurality of transfer rules A and B (FIG. 2) for transferring data over network 2, transfer means for transferring data incoming over network 2 in accordance with one of the plurality of transfer rules A and B, and rule switching means for switching one transfer rule to another transfer rule when the communication apparatus receives a notification from the outside.

For example, a plurality of network configurations resulting from possibility of change in configuration of network 2 can be assumed. The communication apparatus has data storage means (corresponding to a storage) store in advance transfer rules corresponding to the plurality of assumed network configurations. When the communication apparatus receives a notification from the outside, the communication apparatus can readily switch to a transfer rule corresponding to the changed network configuration by switching to any of the stored transfer rules.

The notification may include a notification that the network configuration has changed. The notification can be transmitted from a predetermined device that may be connected to network 2.

In the present disclosure, network 2 is suitable, for example, in the following points when it is applied to a production line in a manufacturing apparatus or a production facility. When a network configuration such as the number or types of communication apparatuses connected to a network is changed with changeover in such a production line, a notification about change is given so that the transfer rule of the communication apparatus can be switched to a transfer rule suitable for the network configuration after changeover.

Figure 2:
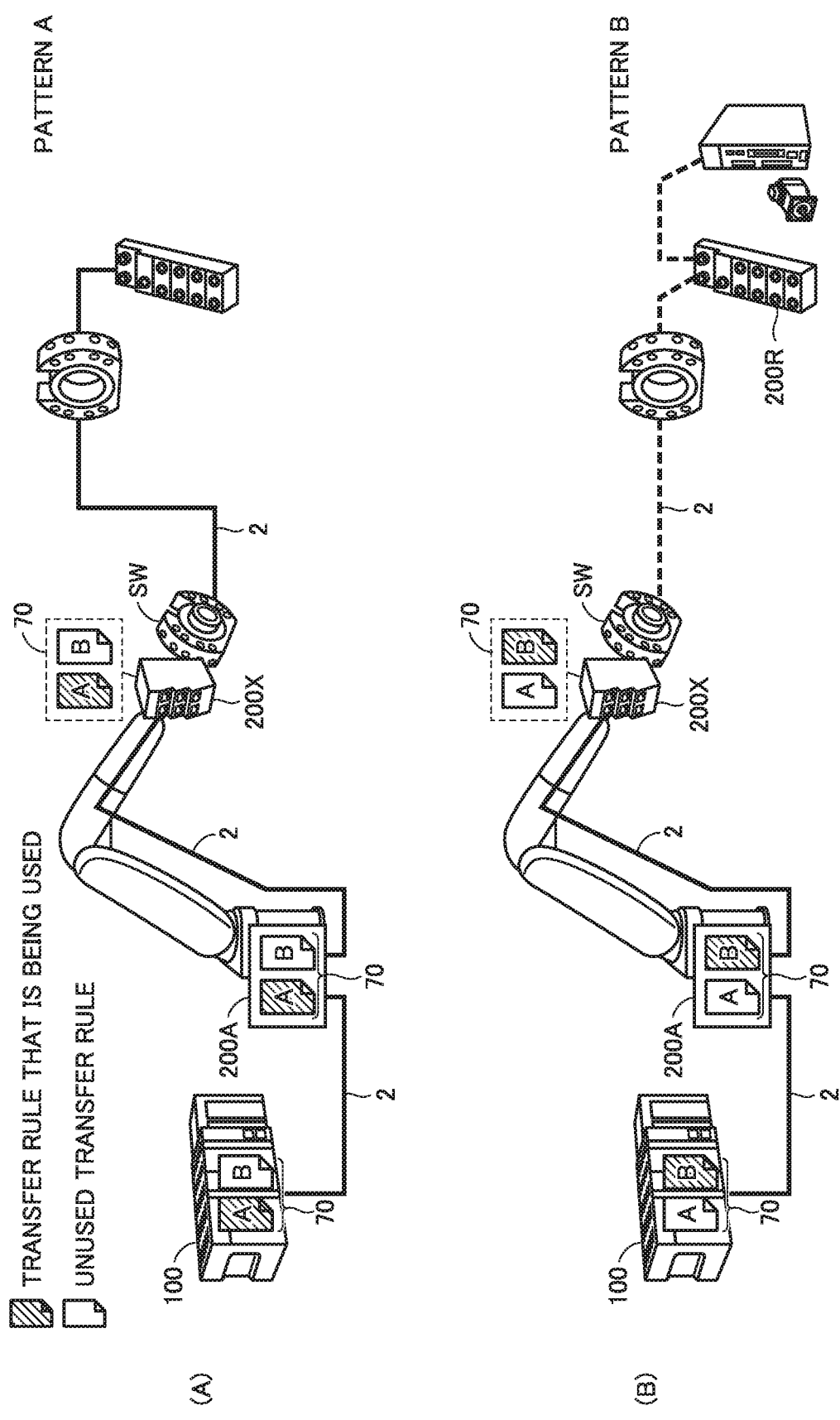
FIG. 2 is a diagram illustrating change in network configuration according to the present embodiment.

For example, in changeover, a partial network configuration including an additional device 200R at a tip end of a robot arm may be attached to a device 200X of the robot in FIG. 2. When attachment is detected, device 200X transmits a notification. Control device 100 and all devices 200A to 200D can receive the notification and change the transfer rule (the transfer rule "A" in FIG. 2→the transfer rule "B"). For transmission of the notification, for example, broadcast can be adopted.

The notification may be transmitted not only from devices 200A to 200D but also from control device 100 to each device. When control device 100 contains information on time of changeover, control device 100 transmits the notification to devices 200A to 200D in accordance with the time information.

In the present embodiment, as shown in FIG. 1, control device 100 and devices 200A to 200D include timers 101 and 201A to 201D that count time in time synchronization, respectively. When the devices receive the notification, the time of switching of the transfer rule can match based on time count by the timers in time synchronization.

A more detailed configuration and processing of control device 100 according to the present embodiment will be described below as a more specific application of the present invention.

<B. Exemplary Overall Configuration of Control System>

An overall configuration of communication system 1 according to the present embodiment will initially be described. FIG. 1 is the diagram schematically showing the configuration of communication system 1 according to the present embodiment.

In the exemplary configuration shown in FIG. 1, control device 100 and the plurality of devices 200A to 200D (which may also collectively be referred to as a "device 200" below) are connected to network 2. Devices 200A to 200D are sequentially connected, for example, in a daisy chain. Though a form of connection between device 200 and control device 100 over network 2 is like a ring, limitation to the ring form is not intended. For example, another form of connection including a bus or a star may be applicable.

Control device 100 functions as a master that manages data transmission within network 2 and devices 200A to 200D function as slaves that transmit data in accordance with a command from the master.

In network 2 of communication system 1, control device 100 and device 200 can each be regarded as a "communication apparatus with a data transfer function."

In the example shown in FIG. 1, each of control device 100 and devices 200A to 200D has a function to transfer, when each receives data (data equivalent to one transfer unit being also referred to as a "frame" below) transmitted over network 2 from an adjacently connected certain communication apparatus, an incoming frame to another adjacently connected communication apparatus as necessary. When the received frame is addressed to the device itself, the device itself processes the frame without transferring the received frame to another communication apparatus.

Control device 100 corresponds to an industrial controller that controls an object to be controlled such as various facilities or apparatuses provided in a manufacturing apparatus or a production line (which is also referred to as a "field" below). Control device 100 is a kind of a computer that performs control operations and it may typically be implemented by a programmable controller (PLC).

An object to be controlled such as a sensor or an actuator may be connected directly or over network 2 to control device 100. In the present embodiment, as shown in FIG. 1, such an object to be controlled may be connected to control device 100 with device 200 and network 2 being interposed.

Each of devices 200 includes an input device that obtains a field signal and an output device or an actuator that takes any action on the field in accordance with an instruction from control device 100. Network 2 provides input and device control as a main function. Network 2 corresponds to a "field network" in a narrow sense. Though the "field network" is generally also referred to as a "field bus," for the sake of brevity of description, network 2 is a concept that may encompass both of the "field network" and the "field bus" in the description below.

Control operations performed by control device 100 include processing (input processing) for collecting data (which is also referred to as "input data" below) collected or generated in device 200, processing (operation processing) for generating data (which is also referred to as "output data" below) such as a command to device 200, and processing (output processing) for transmitting generated output data to device 200 of interest.

A support apparatus 500 may be connected to control device 100. Support apparatus 500 is an apparatus that supports preparation necessary for control device 100 to manage network 2 and preparation necessary for control of an object to be controlled. Support apparatus 500 provides, for example, a setting environment for setting a parameter (configuration) of device 200 connected to control device 100 in connection with management of network 2. Support apparatus 500 may include a personal computer (PC) in which a setting tool that provides a setting environment has been installed.

Though support apparatus 500 is provided separately from control device 100 in communication system 1 shown in FIG. 1, it may be provided integrally with control device 100. Functions of support apparatus 500 may be embedded in control device 100.

Any device 200 can be connected to network 2. Device 200 includes an actuator that provides any physical action to a field and an input and output apparatus that exchanges information with a field.

Data is exchanged between control device 100 and device 200 over network 2. The exchanged data is updated in very short cycles from an order of several hundred μsec. to an order of several ten msec.

<C. Transmitted Data and Communication Performance>

Over network 2 shown in FIG. 1, basically, data (which may also collectively be referred to as "control-oriented data" below) used for control of a manufacturing apparatus or a production facility is cyclically transmitted. Other types of data different from control-oriented data may also be transmitted over network 2. Examples of other types of data include data referred to as "information-oriented data" or "control information-oriented data." Such data is data which requires guaranteed arrival time to some extent although it is not required to have a high real-time ability as in the case of control-oriented data.

Examples of the control-oriented data include a servo command value, an encoder value, and a sensor ON/OFF value. The control-oriented data is cyclically transmitted from control device 100 because it is used for control of a manufacturing apparatus or a production facility. This communication cycle should reliably be guaranteed in communication system 1.

A bus or a network which allows guaranteed time of arrival of data and through which communication is cyclically established is preferably adopted for network 2 according to the present embodiment. For example, a network associated with a known protocol such as EtherCAT® representing one example of a machine control network and EtherNet/IP™ representing such an industrial open network that a control protocol is implemented on general-purpose Ethernet™ may be employed.

<D. Time Synchronization Function>

In communication system 1 shown in FIG. 1, guaranteed time of arrival of data (control-oriented data) sent from a sender to a destination (an addressee) is required as described above. Therefore, communication system 1 makes scheduling for data transmission so as to secure a communication band for control-oriented data in a communication band of network 2 while it maintains a predetermined system cycle (a system cycle Ts which will be described later). More specifically, scheduling for data transmission is made such that control-oriented data is transmitted preferentially to control information-oriented data and information-oriented data.

In order to perform a scheduling function while time of arrival at an addressee is guaranteed, a communication system in which a plurality of communication apparatuses (control device 100 and device 200) in time synchronization with each other are connected over a network is adopted. Each of the communication apparatuses includes a timer in time synchronization (or a counter incremented or decremented in synchronization) and the communication apparatus determines timing of transmission or reception of data in accordance with the timer or the counter in time synchronization.

In the example shown in FIG. 1, control device 100 includes timer 101 and devices 200A to 200D include timers 201A to 201D, respectively. For example, timer 101 of control device 100 functions as a grand master and timers of devices 200A to 200D synchronize timing with the grand master being defined as the reference. Owing to such synchronization among the timers, data transmission timing can match in communication system 1.

Time synchronization among the communication apparatuses in communication system 1 can be realized by adopting a highly accurate time synchronization protocol such as Institute of Electrical and Electronics Engineers (IEEE) 1588, IEEE 802.1AS, or IEEE 802.1AS-Rev.

<E. Change in Network Configuration>

FIG. 2 is a diagram illustrating change in network configuration according to the present embodiment. In the present embodiment, the network configuration is not fixed but may dynamically be changed. FIG. 2 schematically shows a part of network 2 as being extracted for the sake of illustration. Referring to FIG. 2, control device 100 and devices 200A and 200X are connected to network 2. Device 200X is attached, for example, to the tip end of the robot arm corresponding to device 200A. For example, due to changeover in a process, a unit including device 200R attached (connected) to the tip end of the robot arm is switched. Therefore, though network 2 has a network configuration in a pattern A in FIG. 2(A), network 2 may have the network configuration changed to a pattern B in FIG. 2(B) when an attached unit is switched.

In FIG. 2, each device 200 stores in advance a plurality of transfer rules 70 for transferring data over network 2. Transfer rule 70 is created for each type of the network configuration of which change may be expected in network 2, and stored in control device 100 and each device 200. In FIG. 2, for example, the plurality of transfer rules 70 include a transfer rule A corresponding to the network configuration in pattern A and a transfer rule B corresponding to the network configuration in pattern B.

In FIG. 2, a unit connected to a switch SW (a hub switch) of device 200X is different between the network configuration in pattern A and the network configuration in pattern B.

An example in which the network configuration is changed from pattern A to pattern B is described. Device 200X accepts an output signal from switch SW provided at the tip end of the robot arm through a port. Based on change in pattern in the signal accepted through the port, device 200X detects attachment of the unit, that is, change in network configuration from FIG. 2(A) to FIG. 2(B). When change is detected, device 200X switches transfer rule 70 from transfer rule A to transfer rule B. The device transfers a notification N to another device 200 and control device 100 over network 2. Another device 200 and control device 100 switch transfer rule 70 from transfer rule A to transfer rule B in accordance with received notification N. When the network configuration is changed from pattern B to pattern A as well, device 200X performs processing as in change to pattern B. Though two types of transfer rules A and B are defined as transfer rule 70 in FIG. 2, three or more types of transfer rules may be applicable.

Thus, in network 2, control device 100 and all devices 200 can autonomously detect change in network configuration and make switching to a transfer rule corresponding to the changed network configuration.

(Modification)

Though notification N is transmitted by device 200 that detects change in network configuration in FIG. 2, a sender of notification N is not limited to device 200. For example, control device 100 can also transmit notification N to each device 200. Specifically, in an example where control device 100 has obtained predetermined time at which the network configuration is changed, for example, control device 100 broadcasts notification N when the timer in time synchronization counts up to the predetermined time. Thus, even in an example where control device 100 transmits notification N, when the network configuration is changed, all devices 200 and control device 100 in network 2 can switch transfer rule 70 to a transfer rule corresponding to the changed network configuration.

<F. Hardware Configuration>

Figure 3:
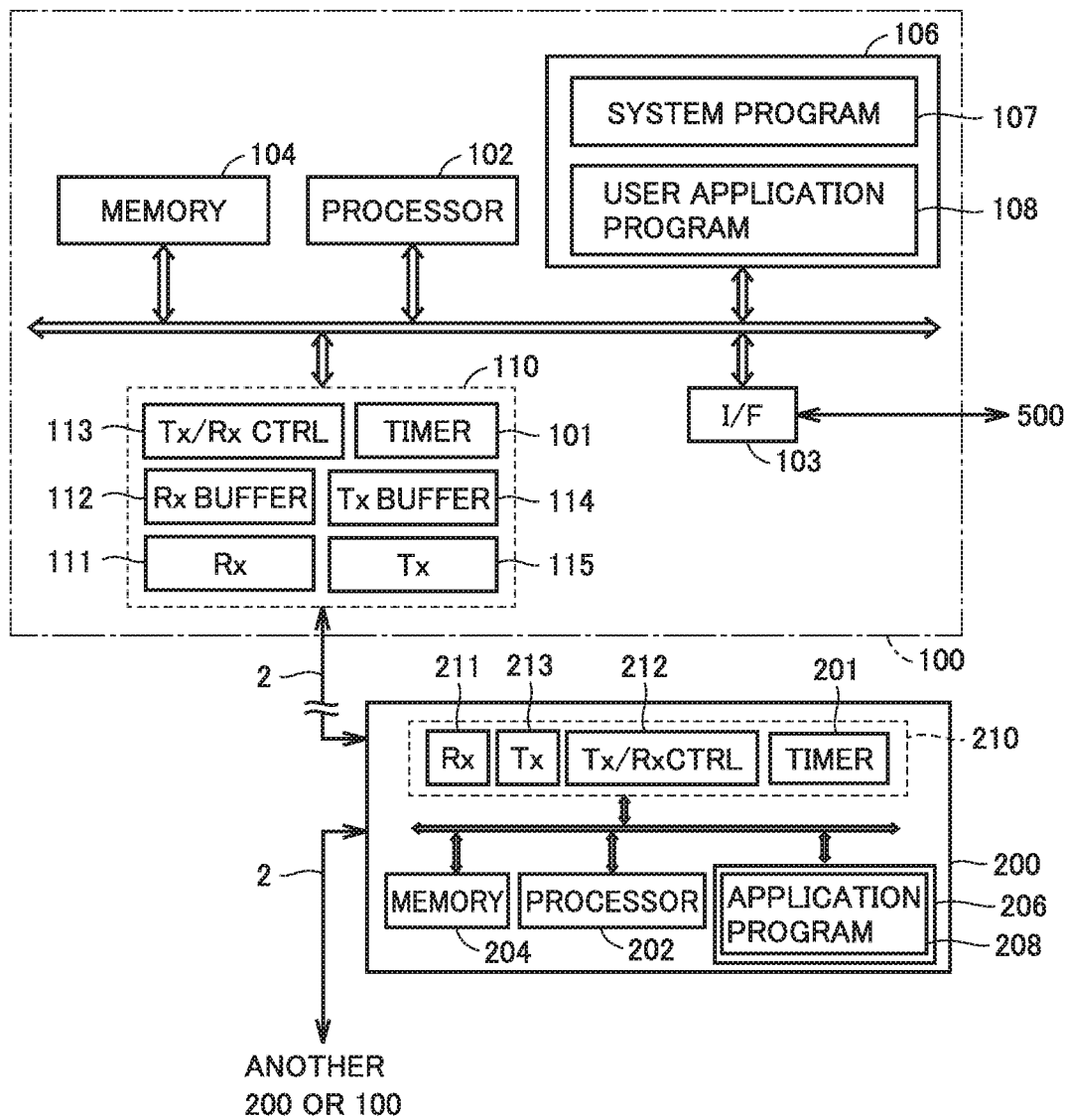
FIG. 3 is a schematic diagram showing an exemplary hardware configuration of the communication system according to the present embodiment.

FIG. 3 is a schematic diagram showing an exemplary hardware configuration of communication system 1 according to the present embodiment. Control device 100 may typically be configured based on a PLC.

Referring to FIG. 3, control device 100 includes as its main components, a processor 102, a memory 104, a storage 106, and a network controller 110. Control device 100 includes an interface (I/F) 103 that communicates with support apparatus 500.

Storage 106 stores a user application program 108 designed in accordance with an object to be controlled, in addition to a system program 107 for control of each component of control device 100. Processor 102 performs various types of processing including processing as will be described later, by reading system program 107 and user application program 108 stored in storage 106 to memory 104 and executing the same. Memory 104 is implemented by a volatile storage device such as a dynamic random access memory (DRAM) or a static random access memory (SRAM).

Network controller 110 provides an interface for control device 100 to exchange data with each device 200 over network 2. Network controller 110 includes as its main components, a reception circuit (Rx) 111, a reception buffer 112, a transmission and reception controller 113, a transmission buffer 114, a transmission circuit (Tx) 115, and timer 101.

Reception circuit 111 receives frames cyclically transmitted over network controller 110 and writes data stored in the received frame into reception buffer 112. Transmission and reception controller 113 successively reads the received frames written in reception buffer 112. Transmission and reception controller 113 extracts only data necessary for processing by control device 100 from the read frames and outputs the data to processor 102. Transmission and reception controller 113 successively writes data or frames to be transmitted to device 200 into transmission buffer 114 in response to a command from processor 102. Transmission circuit 115 successively sends data stored in transmission buffer 114 to network 2 in synchronization with a cycle of transmission of frames over network controller 110. Timer 101 can also serve as a grand master that generates pulses serving as the reference of timing at which an instruction for transmission of a communication frame from transmission and reception controller 113 is to be issued.

Referring to FIG. 3, device 200 performs various functions necessary for implementing control of various facilities or apparatuses by communication system 1. Typically, each of devices 200 is responsible for collection of field information from facilities or apparatuses to be controlled or an output of a command signal to facilities or apparatuses to be controlled. Each of devices 200 includes as its main components, a processor 202, a memory 204, a storage 206, and a communication circuit 210. Communication circuit 210 processes a frame transmitted over network 2. When communication circuit 210 receives some frame over network 2, it writes data into the received frame and/or reads data from the frame and thereafter transfers the frame to device 200 located in the next place on network 2.

More specifically, communication circuit 210 includes a reception circuit (Rx) 211, a transmission and reception controller 212, a transmission circuit (Tx) 213, and a timer 201. Reception circuit 211 and transmission circuit 213 are components physically connected to network 2 and they receive a frame transmitted over network 2, processes the received frame, and sends the processed frame to network 2 in response to a command from transmission and reception controller 212. Transmission and reception controller 212 writes data into a frame transmitted over network 2 and/or reads data from the frame. Timer 201 generates a clock serving as the reference of timing of output of a command by transmission and reception controller 212 or timing of processing by device 200. Timer 201 generates a clock with a clock from timer 101 of control device 100 being defined as the reference. Communication system 1 can thus achieve time synchronization among a plurality of communication apparatuses including control device 100 and devices 200.

<G. Configuration of Frame>

Figure 4:
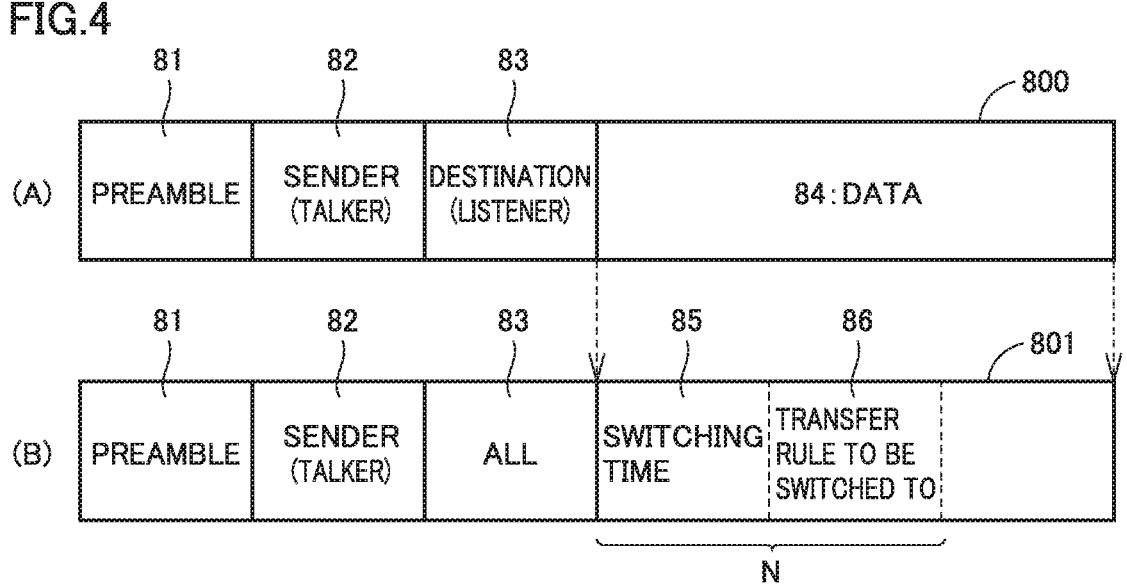
FIG. 4 is a diagram schematically showing a configuration of a frame according to the present embodiment.

FIG. 4 is a diagram schematically showing a configuration of a frame according to the present embodiment. FIG. 4(A) shows an exemplary configuration of a frame 800 for transmission of various types of data including control-oriented data and FIG. 4 (B) shows an exemplary configuration of a frame 801 for transmission of notification N described above. Referring to FIGS. 4(A) and (B), frames 800 and 801 each include, for example, a preamble portion, a header portion, and a data portion. In addition, the frame may include a frame check sequence (FCS) portion for error sensing. The preamble portion stores a preamble 81 representing a synchronization signal indicating start of the frame. The header portion stores a sender 82 of the frame which is a TALKER in network 2 and a destination 83 which is a LISTENER of the frame. Various addresses can be applied to sender 82 and destination 83. The data portion stores data 84 to be transmitted over network 2.

In exemplary frame 800 in FIG. 4(A), the data portion may store various types of data including control-oriented data. In the present embodiment, in frame 800 that stores control-oriented data as data 84, sender 82 thereof indicates control device 100 and destination 83 indicates an arbitrary device 200.

In exemplary frame 801 in FIG. 4(B), the data portion stores notification N including information indicating time 85 of switching of a transfer rule and information representing a transfer rule to be switched to 86. Destination 83 of frame 801 indicates "all" communication apparatuses (control device 100 and all devices 200), for example, broadcasting. Switching time 85 according to the present embodiment may represent a concept including a time point of switching (for example, hour, minute, and second and a value of the counter) or a length of time until switching. The length of time until switching may include, for example, a length of time from detection of change in network configuration until switching of the transfer rule. For example, when the transfer rule is switched X seconds after detection of change in network configuration, switching time 85 may represent X seconds or both of the time of detection of change in network configuration and X seconds. Switching time 85 is not limited to the time or the time period described above but may be expressed, for example, by a value of the counter corresponding to the timer.

The configuration of the frame in FIG. 4 is by way of example and not limiting. Though a format of data transmitted over network 2 is defined as a frame in the present embodiment, limitation to the frame is not intended.

<H. Network Configuration Tool>

Figure 5:
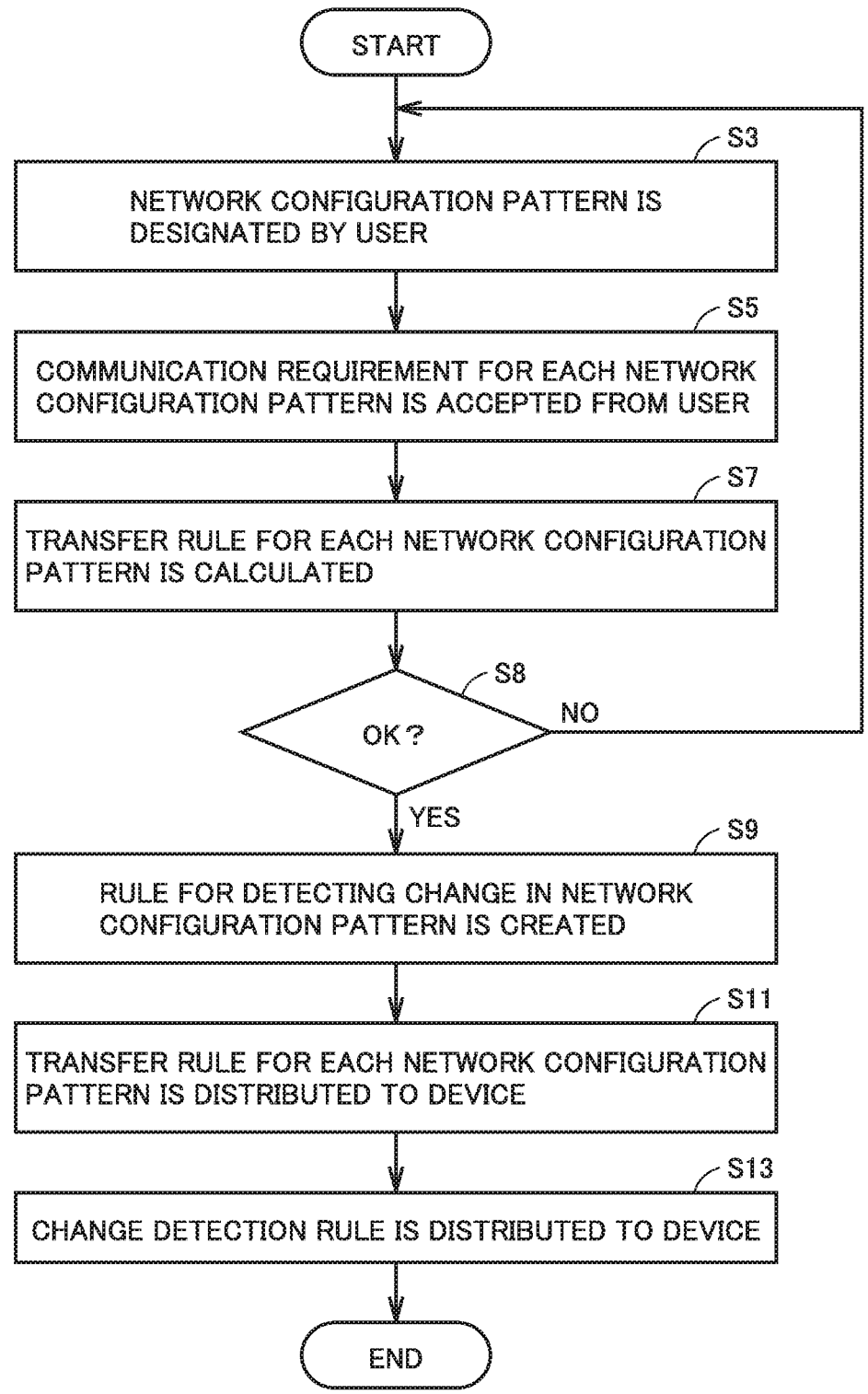
FIG. 5 is a flowchart showing exemplary processing in a network configuration tool according to the present embodiment.

FIG. 5 is a flowchart showing exemplary processing in a network configuration tool according to the present embodiment. In the present embodiment, an environment in which transfer rule 70 corresponding to each network configuration pattern and a change detection rule for detecting change in network configuration are created is provided by a network configuration tool in FIG. 5.

As a program of a network configuration tool is executed in support apparatus 500 or control device 100, the environment for creating rules is provided. A user can create transfer rule 70 and a change detection rule in the environment for creating rules by operating support apparatus 500. User application program 108 of control device 100 includes a program for the network configuration tool and processor 102 executes the program for the network configuration tool.

Referring to FIG. 5, processor 102 accepts information designating a plurality of network configuration patterns that may be assumed in network 2 from a user through support apparatus 500 (step S3). The user operates support apparatus 500 to designate a plurality of network configuration patterns. In order to simplify description, an example in which network configuration patterns of pattern A and pattern B shown in FIG. 2 are designated will be described.

Processor 102 accepts a communication requirement corresponding to the network configuration pattern from the user (step S5). FIG. 6 is a diagram schematically showing an exemplary communication requirement according to the present embodiment. FIG. 6 shows communication requirements 50A and 50B in correspondence with network configuration patterns A and B, respectively. FIG. 6 specifically representatively shows information on communication requirement 50A. Referring to FIG. 6, communication requirement 50A includes, in correspondence with each flow 57 represented by a set of a sender 54 and a destination 55 included in corresponding network configuration pattern A, a stream ID 51 for identification of the flow, a size 52 of data transmitted in the flow, a communication cycle 53, and an allowable delay time 56. The delay time corresponds to transmission jitter or latency in transmission. Since communication requirement 50A and communication requirement 50B each include information similar in type, details of communication requirement 50B are not provided.

Processor 102 calculates a transfer rule corresponding to each network configuration pattern in accordance with the communication requirement accepted in step S5 (step S7). The transfer rule includes transmission timing, routing of a switch that is passed through, and priority in frame transmission. The transfer rule corresponding to each calculated network configuration pattern is shown on support apparatus 500.

Processor 102 determines whether or not to adopt the calculated transfer rule in accordance with a user instruction from support apparatus 500 (step S8). When processor 102 determines that the calculated transfer rule is to be adopted (YES in step S8), transition to step S9 is made. When processor 102 determines that the calculated transfer rule is not to be adopted (NO in step S8), the process returns to step S3 and subsequent processing is performed as described above.

In step S9, processor 102 creates a rule for sensing change in each network configuration in accordance with a content of a user operation accepted from support apparatus 500 (step S9).

Processor 102 distributes the rule for transferring each network configuration pattern to each device 200 and has the rule stored in a non-volatile storage area of the device to which control device 100 belongs such as storage 106 (step S11). Each device 200 receives the transfer rule from control device 100 and stores the received transfer rule in its non-volatile storage area such as storage 206.

Processor 102 transmits the change detection rule to predetermined device 200 (step S13). Predetermined device 200 is, for example, a communication apparatus to which a unit including device 200R as described with reference to FIG. 2 is removably attached.

Each communication apparatus in network 2 can thus obtain a transfer rule corresponding to each network configuration pattern. Predetermined device 200 can obtain the change detection rule.

<I. Change Detection Rule>

FIG. 7 is a diagram schematically showing an exemplary change detection rule 60 according to the present embodiment. Change detection rule 60 is distributed to predetermined device 200. Predetermined device 200 includes device 200 that can be a branch point in a network configuration to which a unit including a new device is attached. For example, in FIG. 2, device 200X is defined as predetermined device 200.

In the present embodiment, a unit can removably be attached to a port through which data is transferred in a communication apparatus (control device 100 or device 200). When the unit is attached or removed, a potential of the port (a level "High" or "Low") is varied. Therefore, the communication apparatus can detect whether or not the unit has been attached based on variation in potential of the port.

Referring to FIG. 7, change detection rule 60 includes a plurality of patterns 62 and information on a transfer rule 63 associated with each pattern 62. Pattern 62 includes a pattern of variation in potential of the port when the unit is attached to each port provided in a predetermined communication apparatus. Transfer rule 63 represents a transfer rule to be applied to the changed network configuration when the unit is attached.

In the present embodiment, the potential variation pattern is different depending on a type of a unit to be attached. Therefore, the predetermined communication apparatus determines a variation pattern when the potential of the port of the predetermined communication apparatus itself is varied, and checks (compares) the determined variation pattern against a pattern of patterns 62 in change detection rule 60. The communication apparatus identifies pattern 62 that matches with the variation pattern based on a result of checking (comparison). When the communication apparatus successfully identifies the pattern, it can determine transfer rule 63 associated with identified pattern 62 as transfer rule to be switched to 86 to be distributed by issuing notification N.

<J. Transfer Rule>

Figures 8, 9:
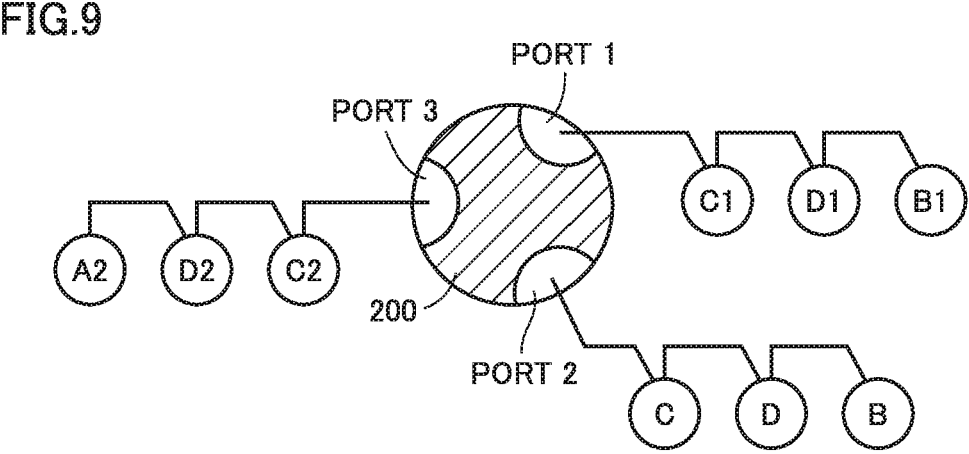
FIG. 8 is a diagram schematically showing an exemplary transfer rule according to the present embodiment.
FIG. 9 is a diagram schematically showing an exemplary network configuration for illustrating the transfer rule in FIG. 8.

FIG. 8 is a diagram schematically showing an exemplary transfer rule according to the present embodiment. In the present embodiment, the transfer rule may include such a rule as information on routing of a frame for setting a transmission path or timing of communication relating to setting of a communication band for transmission (in an example of IEEE802.1Qbv, gate active timing).

FIG. 9 is a diagram schematically showing an exemplary network configuration for illustrating the transfer rule in FIG. 8. In the network configuration in FIG. 9, relation of connection among a plurality of communication apparatuses (control device 100 or device 200) is schematically shown, with device 200 shown with hatching being located in the center. Device 200 in the center includes, for example, ports P1, P2, and P3 as ports for transmission and reception of a frame over network 2. A communication apparatus "A2" connected to port P3 corresponds to control device 100.

In the network configuration pattern in FIG. 9, in step S7 in FIG. 5, for example, transfer rule 70 in FIG. 8 may be created for device 200 in the center. Referring to FIG. 8, transfer rule 70 includes designation of an output port 73 in connection with information on routing of a frame as well as priority 74 and a gate time period 75 in connection with timing of communication, in association with each of at least one flow 76 via device 200 in the center, among the plurality of flows 76 including a sender 71 and a destination 72 extracted from the network configuration.

Output port 73 represents an identifier of an output port to be used in sending a frame to be transmitted in flow 76 to network 2. Priority 74 and gate time period 75 are set such that a communication band for control-oriented data is most preferentially secured in a communication band of network 2. Specifically, in the present embodiment, transfer rule 70 is set such that control-oriented data is transmitted preferentially to other types of information (control information-oriented data and information-oriented data). More specifically, among the flows to which corresponding output ports are allocated, flow 76 in which control-oriented data is transmitted, that is, flow 76 in which control device 100 (communication apparatus A in FIG. 9) is sender 71, is given the highest priority. Priority lower than the former is sequentially allocated to other flows 76, for example, in accordance with a size of data to be transmitted or a cycle. "Flow 76 being given the highest priority" means that priority of flow 76 is highest among the plurality of flows 76. For data transmission in flow 76 to which the highest priority is given among other flows, a communication band is secured earliest.

Gate time period 75 represents a duration for which an output gate connected to a corresponding output port is active. When the output gate is activated, a frame is sent from the output gate to network 2 through a corresponding port. As corresponding priority 74 is higher, longer gate time period 75 is set.

Thus, transfer rule 70 may include a path rule for setting a transmission path (flow 76) for transferring a frame (corresponding to data) from the communication apparatus (device 200 or control device 100) to another communication apparatus. The path rule includes a rule identifying one of a plurality of ports 1 to 3 based on sender 71 and destination 72 of a frame (data).

Transfer rule 70 includes priority 74 and gate time period 75 as a band rule for setting a communication band for transmission of a frame (data) in a communication band of network 2. The band rule includes a rule for most preferentially securing a communication band for control-oriented data in the communication band of network 2.

Since the network configuration in FIG. 9 is merely by way of example, transfer rule 70 in FIG. 8 created in correspondence with the network configuration is also merely by way of example. Regarding a format of transfer rule 70, output port 73, priority 74, and gate time period 75 should only be associated with each flow 76, and association is not limited to a table format as in FIG. 8.

<K. Transfer Control in Communication Apparatus>

Figure 10:
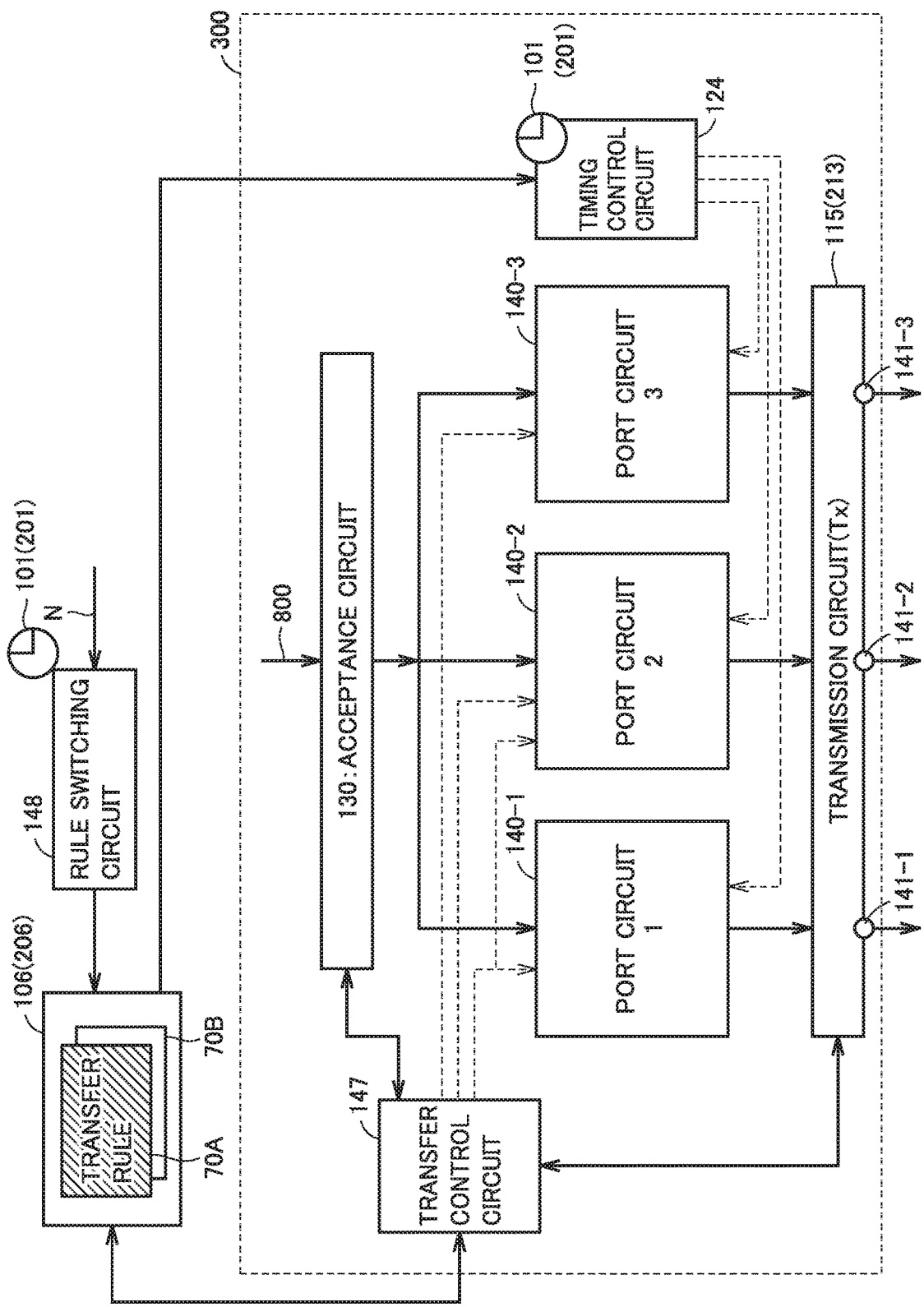
FIG. 10 is a schematic diagram showing an exemplary circuit 300 mainly relating to data transfer control, in a configuration of a communication apparatus according to the present embodiment.

FIG. 10 is a schematic diagram showing an exemplary circuit 300 mainly relating to data transfer control in the configuration of the communication apparatus according to the present embodiment. Circuit 300 corresponds to transfer means for transferring data (frame) incoming over network 2 in accordance with one of a plurality of transfer rules 70.

In FIG. 10, a plurality of port circuits 140-1 to 140-N are connected to transmission circuit 115 (213) of the communication apparatus (control device 100 or device 200). Though three port circuits 140-1, 140-2, and 140-3 are illustrated for the sake of brevity of description, the number of ports is not limited to three. Port circuits 140-1 to 140-N may also collectively be referred to as a "port circuit 140" below.

Processor 102 of control device 100 performs various types of processing by reading system program 107 and user application program 108 stored in storage 106 to memory 104 and executing the same. Memory 104 is implemented by a volatile storage device such as a dynamic random access memory (DRAM) or a static random access memory (SRAM). Storage 106 is implemented by a non-volatile storage device such as a hard disk or a flash memory. Storage 106 stores user application program 108 designed in accordance with an object to be controlled, in addition to system program 107 for control of each component of control device 100.

Processor 202 of device 200 performs various types of processing by reading application program 208 stored in storage 206 to memory 204 and executing the same. Memory 204 is implemented by a volatile storage device such as a dynamic random access memory (DRAM) or a static random access memory (SRAM). Storage 206 is implemented by a non-volatile storage device such as a hard disk or a flash memory. Storage 206 stores application program 208 for carrying out transfer control in accordance with transfer rule 70, in addition to control programs for control of each component of device 200.

Referring to FIG. 10, the communication apparatus includes, for transfer of frame 800, a timing control circuit 124, port circuits 140-1, 140-2, and 140-3, an acceptance circuit 130 that accepts frame 800 to be transmitted, a transfer control circuit 147, and a rule switching circuit 148. Port circuits 140-1, 140-2, and 140-3 are provided in correspondence with ports 141-1 to 141-3 of transmission circuit 115 (213), respectively. In storage 106 (206), transfer rules 70A and 70B are stored as being readable by timing control circuit 124 and transfer control circuit 147. These circuits may be implemented as a hard-wired configuration (hardware implementation) such as an application specific integrated circuit (ASIC) or a field-programmable gate array (FPGA) or configured (software implementation) to provide a necessary function by execution of a program by the processor. A form of implementation as combination of hardware implementation and software implementation may be adopted. An optimal form of implementation is adopted as appropriate in accordance with an application of the communication apparatus or required specifications.

When the communication apparatus receives frame 801, rule switching circuit 148 sets, of transfer rules 70A and 70B stored in storage 106 (206), the transfer rule indicated by transfer rule to be switched to 86 in notification N in frame 801 to a readable state and sets the other to a non-readable state. This setting is made when timer 101 (201) counts up to switching time 85 in notification N. Therefore, when the network configuration has been changed, all communication apparatuses can simultaneously switch to the transfer rule corresponding to the changed network configuration pattern. Though the transfer rule is switched by setting only one of transfer rules 70A and 70B indicated by transfer rule to be switched to 86 to the readable state and the other to the non-readable state in the present embodiment, a switching method is not limited to that method.

An example in which switching to transfer rule 70A has been made by switching of the transfer rule will be described.

Figure 11:
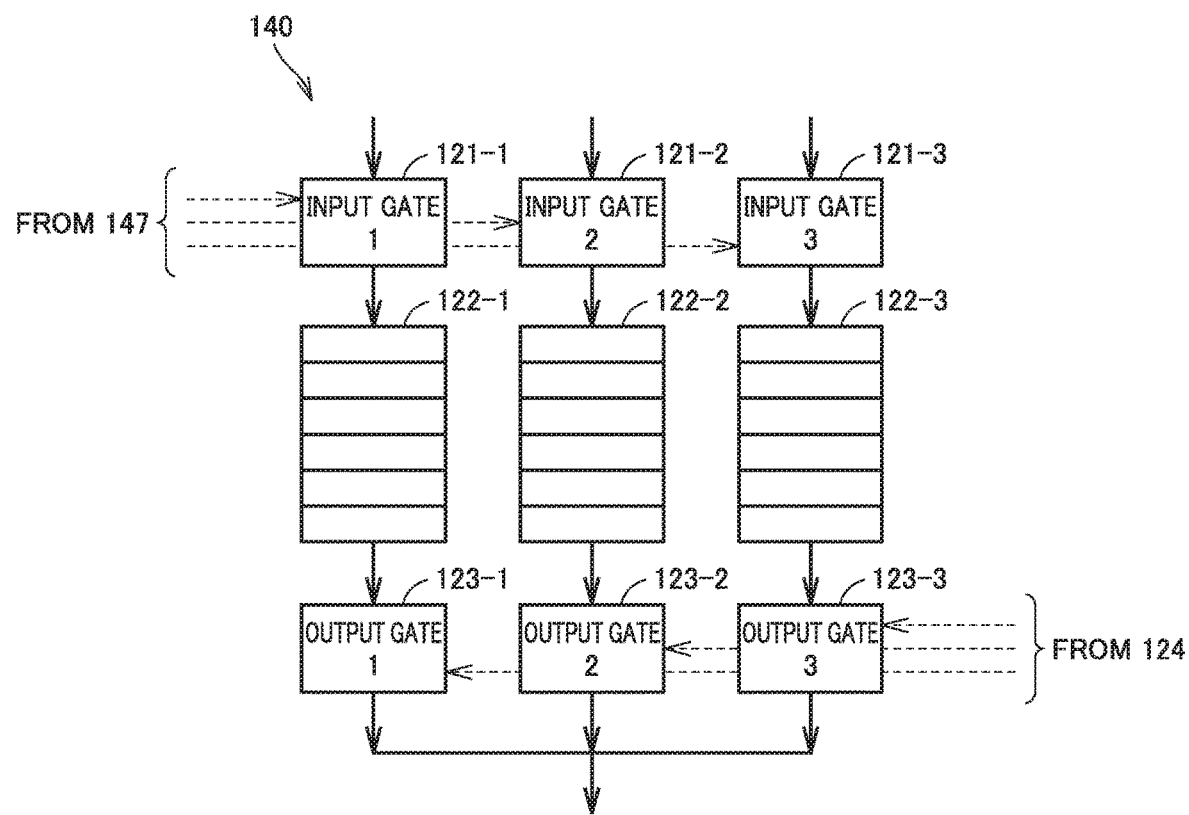
FIG. 11 is a schematic diagram showing an exemplary more detailed configuration of a port circuit shown in FIG. 10.

FIG. 11 is a schematic diagram showing an exemplary more detailed configuration of port circuit 140 shown in FIG. 10. Referring to FIG. 11, each of port circuits 140 includes a plurality of input gates 121-1 to 121-M (which may also collectively be referred to as an "input gate 121" below), a plurality of queues 122-1 to 122-M (which may also collectively be referred to as a "queue 122" below), and a plurality of output gates 123-1 to 123-M (which may also collectively be referred to as an "output gate 123" below). When acceptance circuit 130 accepts frame 800, it outputs accepted frame 800 to all port circuits 140. Transmission circuit 115 (213) sends frame 800 output from each port circuit 140 to network 2 through port 141 corresponding to port circuit 140. FIG. 11 shows input gates 121-1, 121-2, and 121-3, queues 122-1, 122-2, and 122-3, and output gates 123-1, 123-2, and 123-3. Though three input gates 121, three queues 122, and three output gates 123 are provided in FIG. 11, the number is not limited to three.

Referring to FIG. 11, a circuit that successively stores a plurality of frames and is constituted of input gate 121, queue 122, and output gate 123 is mounted on each of port circuits 140. In each port circuit 140, frames 800 queue up in a plurality of queues 122 and timing of output from each queue 122 is controlled.

Transfer control circuit 147 checks sender 82 and destination 83 of frame 800 accepted by acceptance circuit 130 against each flow 76 of transfer rule 70A. Transfer control circuit 147 reads output port 73 and priority 74 associated with flow 76 in which a result of checking indicates match, identifies one of the plurality of port circuits 140 in accordance with read output port 73, selects one of input gates 121 of identified port circuit 140 in accordance with priority 74, and activates selected input gate 121. Frames 800 accepted by acceptance circuit 130 are successively stored in queue 122 connected to activated input gate 121 of identified port circuit 140.

Timing control circuit 124 refers to priority 74 and gate time period 75 of each output port 73 in transfer rule 70A, sequentially selects one of output gates 123-1 to 123-M of port circuit 140 in accordance with priority 74 in each port circuit 140, and makes such scheduling as activating selected output gate 123 only for a time period indicated by corresponding gate time period 75. A duration for which the output gate is active under the scheduling is counted by timer 101 or timer 201 in time synchronization.

Figure 12:
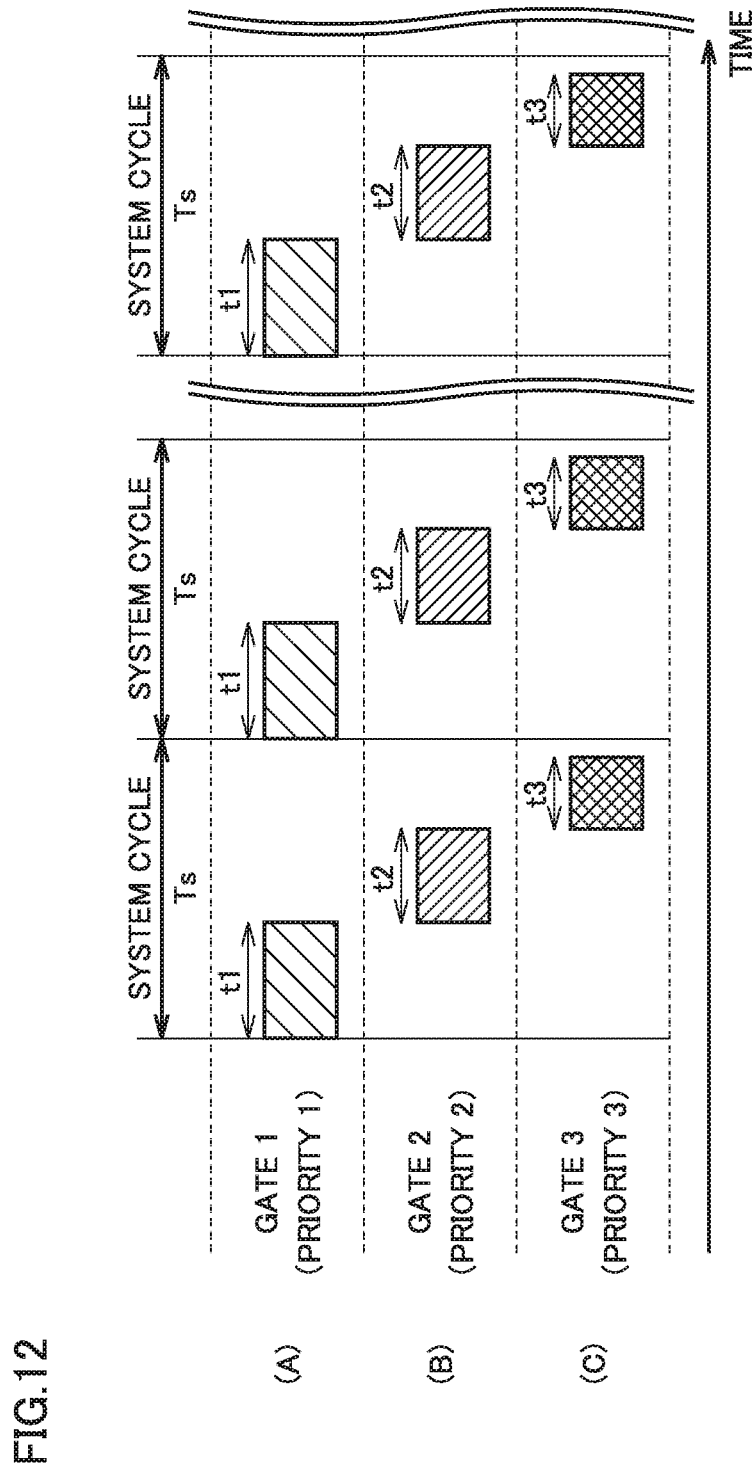
FIG. 12 is a diagram schematically showing scheduling of transfer of a frame according to the present embodiment.

FIG. 12 is a diagram schematically showing scheduling of transfer of a frame according to the present embodiment. According to scheduling by timing control circuit 124, in a predetermined system cycle Ts, frame 800 in queue 122 that stores frame 800 in flow 76 highest in priority among frames 800 stored in queues 122-1 to 122-M in each port circuit 140 is sent most preferentially to network 2. Therefore, as shown in FIG. 12(A), in each port circuit 140, output gate 123-1 is activated for a longest time period t1 (>t2>t3). As in FIG. 12(B), output gate 123-2 is activated for a time period t2 within a remaining time period (Ts−t1) of system cycle Ts. As in FIG. 12(C), output gate 123-3 is activated for a time period t3 within a remaining time period (Ts−t1−t2) of system cycle Ts.

A communication band for data, that is, control-oriented data, in a flow that should most preferentially be transmitted in each system cycle Ts is thus reliably secured. Transmission of control-oriented data in system cycle Ts from control device 100 to a manufacturing apparatus or a production facility can thus be guaranteed.

<L. Detection of Change in Network Configuration>

Figure 13:
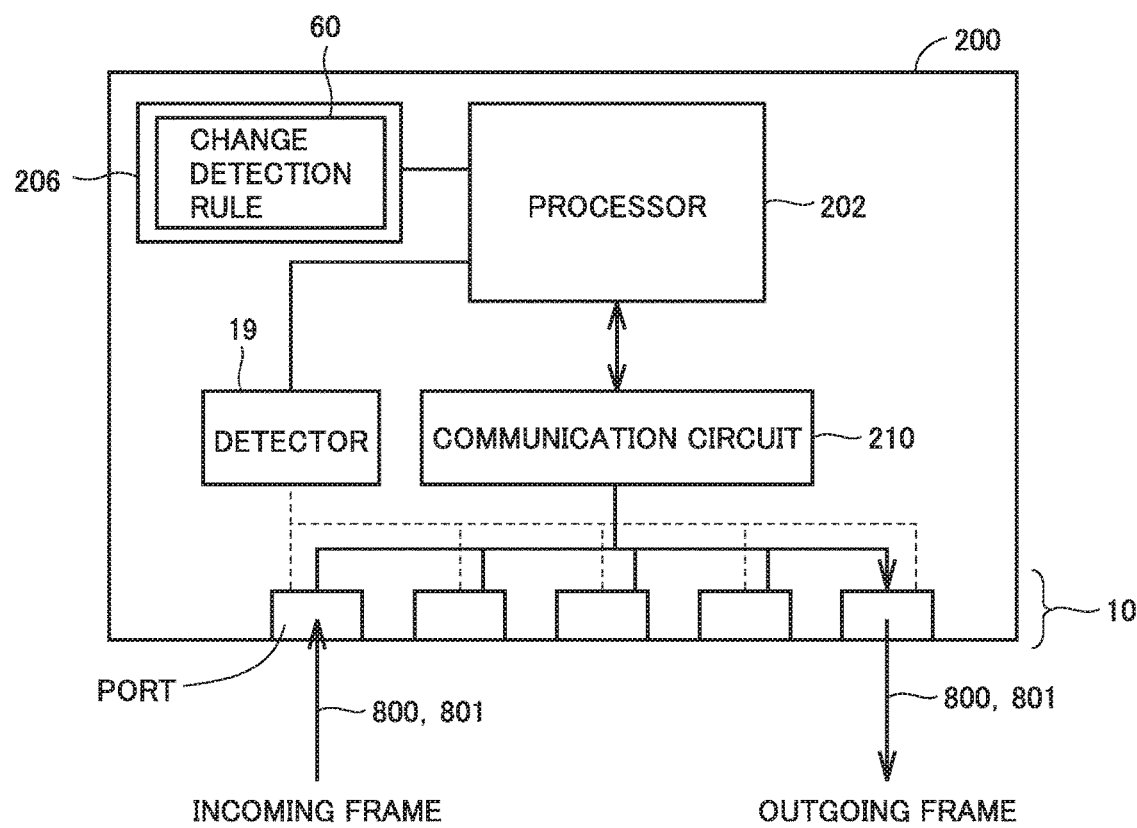
FIG. 13 is a diagram schematically showing an exemplary circuit that detects change in network configuration according to the present embodiment.
Figure 14:
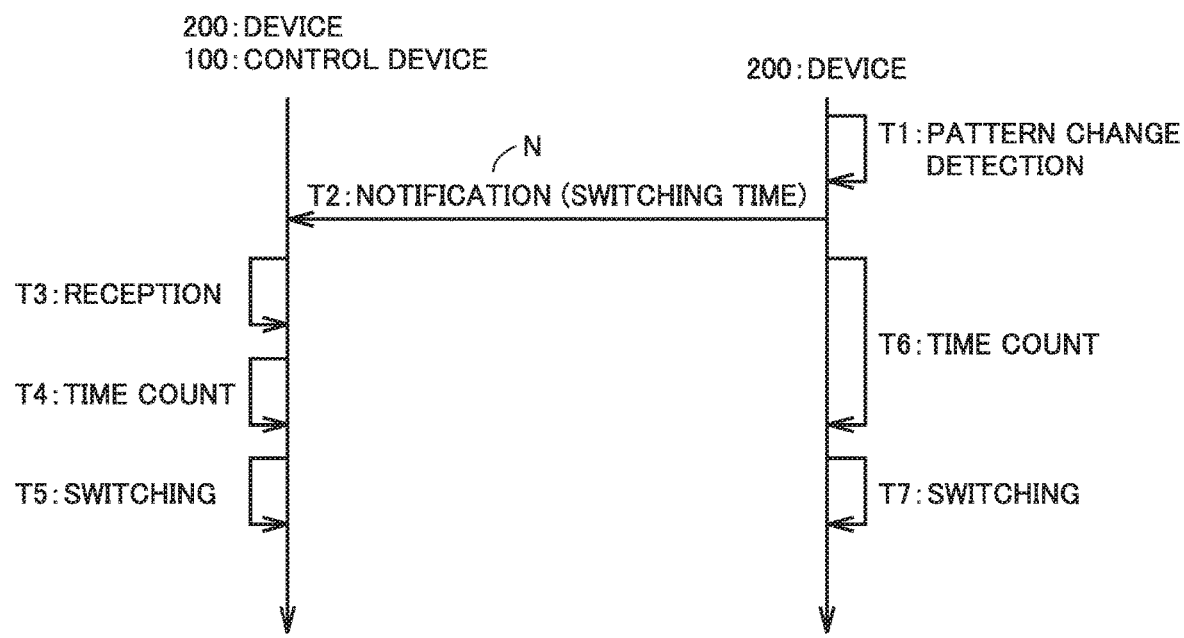
FIG. 14 is a diagram schematically showing an exemplary sequence in detection of change in network configuration and switching of a transfer rule according to the present embodiment.

FIG. 13 is a diagram schematically showing an exemplary circuit that detects change in network configuration according to the present embodiment. FIG. 14 is a diagram schematically showing an exemplary sequence in detection of change in network configuration and switching of a transfer rule according to the present embodiment. The circuit in FIG. 13 is provided in each device 200. Referring to FIG. 13, the configuration of device 200 is the same as a configuration that a detector 19 is added to the configuration in FIG. 3. FIG. 13, however, shows only a peripheral circuit associated with detector 19 and does not show other circuits for the sake of description.

Referring to FIG. 13, detector 19 detects a potential of each port in a port group 10 that can receive input and provide output of frame 800 (801) in device 200 and outputs a result of detection to processor 202. Port group 10 is a concept that can encompass also port 141 in FIG. 10.

Referring to FIG. 14, processor 202 determines whether or not a pattern of the potential (the level "High" or "Low") of each port in port group 10 indicated by a result of detection by detector 19 has been varied (step T1). When processor 202 has determined that the pattern has been varied, it reads from change detection rule 60, transfer rule 63 associated with pattern 62 that matches with the detected pattern of variation in potential. Processor 202 creates frame 801 including notification N in which read transfer rule 63 is set as transfer rule to be switched to 86 and sends the frame addressed to each device 200 to network 2 (step T2).

When each of other devices 200 and control device 100 receive frame 801 (step T3), they count up to switching time 85 of frame 801 (step T4). When the time is counted up to switching time 85, rule switching circuit 148 switches the transfer rule in accordance with transfer rule to be switched to 86 (step T5). In device 200 which is the sender of notification N as well, processor 202 in FIG. 13 counts up to switching time 85 (step T6). When the time is counted up to switching time 85, rule switching circuit 148 in the sender device switches the transfer rule in accordance with transfer rule to be switched to 86 (step T7).

Since the time is thus counted up to switching time 85 (steps T4 and T6) by the timers in time synchronization, all communication apparatuses (device 200 and control device 100) connected to network 2 can autonomously simultaneously switch the transfer rule in accordance with transfer rule to be switched to 86.

Transfer rule 70 may be set in accordance with a type of data (control-oriented data, information-oriented data, or control information-oriented data) transmitted in each flow. Priority may be set depending on a type of data.

<M. Additional Aspects>

The present embodiment as described above encompasses technical concepts as below.

[Configuration 1]

A communication system (1) in which a plurality of communication apparatuses (100, 200) are connected to a network (2),
  at least one of the plurality of communication apparatuses including
    rule storage means (106, 206) for storing a plurality of transfer rules (70A, 70B) for transferring data over the network,
    transfer means (300) for transferring data (800) incoming over the network in accordance with one transfer rule of the plurality of transfer rules, and
    rule switching means (148) for switching the one transfer rule to another transfer rule when the communication apparatus receives a notification (N) from the outside.

[Configuration 2]

The communication system described in the configuration 1, wherein
  the plurality of communication apparatuses are in time synchronization with one another, and
  the notification includes information (85) on time of switching of the one transfer rule to another transfer rule.

[Configuration 3]

The communication system described in the configuration 1 or 2, wherein
  the notification includes information representing a transfer rule to be switched to.

[Configuration 4]

The communication system described in any one of the configurations 1 to 3, wherein when a network configuration representing a manner of connection of the plurality of communication apparatuses over the network is changed, the notification is transmitted to the network.

[Configuration 5]

The communication system described in the configuration 4, wherein when change in network configuration is detected, another communication apparatus of the plurality of communication apparatuses broadcasts the notification over the network.

[Configuration 6]

The communication system described in any one of the configurations 1 to 5, wherein the transfer rule includes a path rule (76) for setting a transmission path in the network for transferring the incoming data to another communication apparatus.

[Configuration 7]

The communication system described in the configuration 6, further including a plurality of ports (141-1 to 141-3) from which the incoming data is sent to the network, wherein the plurality of ports correspond to the plurality of transmission paths, respectively, and the path rule includes a rule (73) that identifies one of the plurality of ports based on a sender and a destination of the incoming data.

[Configuration 8]

The communication system described in any one of the configurations 1 to 7, wherein the transfer rule includes a band rule (74) for setting a communication band in which the data is to be transmitted, in a communication band of the network.

[Configuration 9]

The communication system described in the configuration 8, wherein the network includes a network over which data for controlling a manufacturing apparatus or a production facility is transmitted, and the band rule includes a rule for securing a communication band for the data in the communication band of the network.

[Configuration 10]

A communication apparatus (100, 200) connected to a communication system (1) over a network, the communication apparatus comprising:

rule storage means (106, 206) for storing a plurality of transfer rules (70) for transferring data to another communication apparatus over the network;

transfer means (300) for transferring data (800) incoming over the network in accordance with one transfer rule of the plurality of transfer rules; and rule switching means (148) for switching the one transfer rule to another transfer rule when the communication apparatus receives a notification (N) from the outside.

[Configuration 11]

A communication method in a communication system (1) in which a plurality of communication apparatuses (100, 200) are connected to a network (2), the communication method comprising:

by at least one of the plurality of communication apparatuses, transferring data (800) incoming over the network in accordance with one transfer rule of a plurality of transfer rules (70) for transferring data over the network; and switching the one transfer rule to another transfer rule when the communication apparatus receives a notification (N) from the outside.

<L. Advantage>

In the background of the embodiment, in a production line of a manufacturing apparatus or a production facility, a configuration in which a controller, a robot, input and output equipment (a sensor), and a servo are connected over a network is adopted. Depending on change in process (changeover), a unit connected to a tip end of a robot arm may be changed, which in turn may change a network configuration. Such change is desirably completed within a short period of time (for example, one second) and a rule for transferring data such as selection of a path in the network is also required to be adapted to the changed network configuration.

According to the conventional art, however, computation of a configuration adapted to the changed network configuration should newly be performed and time has been required until communication is established in the changed network configuration. Use of a transfer rule adapted to a network configuration largest in number of connected devices among network configurations to which change is assumed in advance may also be assumed. In this case, depending on a manner of connection of a device in the network configuration, a problem of non-optimal scheduling such as a long time required for data transfer may arise.

In contrast, in the present embodiment, a communication apparatus stores a plurality of transfer rules in advance and rule switching circuit 148 switches one current transfer rule to another transfer rule when the communication apparatus receives notification N from the outside. Thus, the rule for transferring data over a communication network can flexibly be changed without spending time and cost.

The transfer rule is prepared and stored for each of assumed network configurations. Thus, when a notification about change in network configuration is given, data transfer in accordance with a transfer rule corresponding to the changed network configuration can be achieved and scheduling in transfer can be optimized.

It should be understood that the embodiment disclosed herein is illustrative and non-restrictive in every respect. The scope of the present invention is defined by the terms of the claims rather than the description above and is intended to include any modifications within the scope and meaning equivalent to the terms of the claims.

REFERENCE SIGNS LIST 1 communication system; 2 network; 19 detector; 60 change detection rule; 70, 70A, 70B, A, B transfer rule; 74 priority; 75 gate time period; 85 switching time; 86 transfer rule to be switched to; 100 control device; 102, 202 processor; 147 transfer control circuit; 148 rule switching circuit; 200 device; 500 support apparatus; 800, 801 frame; N notification; Ts system cycle; t1, t2, t3 time period

The invention claimed is:

1. A communication system in which a plurality of communication apparatuses are connected to a factory automation network for transferring data for controlling a manufacturing apparatus or a production facility, at least one of the plurality of communication apparatuses comprising a communication port configured to be connected to the network, a detector for detecting a potential of the communication port, and a processor configured with a program to perform operations comprising:

operation as a rule storage for storing a plurality of transfer rules for transferring data over the network, operation as a transfer module for transferring data incoming over the network in accordance with one transfer rule of the plurality of transfer rules, operation as a rule switching module for switching the one transfer rule to another transfer rule in response to the at least one communication apparatus receiving a notification from outside, and operation for detecting change in a network configuration of the network based on a pattern of variation in the potential of the communication port, wherein in response to detecting change in the network configuration, the at least one of the plurality of communication apparatuses broadcasts the notification over the network, and switches the one transfer rule to another transfer rule, the plurality of communication apparatuses are in time synchronization with one another, the notification comprises information on time of switching of the one transfer rule to the other transfer rule, the plurality of communication apparatuses include at least one communication apparatus attached to a robot that is provided as the manufacturing apparatus in the production facility, and the network configuration represents a number or types of the plurality of communication apparatuses connected to the network.

2. The communication system according to claim 1, wherein the notification comprises information representing a transfer rule to be switched to.

3. The communication system according to claim 1, wherein each of the plurality of communication apparatuses connected to the network transfers the data over the network in accordance with a common system cycle.

4. The communication system according to claim 3, wherein in response to change in network configuration being detected, another communication apparatus of the plurality of communication apparatuses broadcasts the notification over the network.

5. The communication system according to claim 1, wherein the transfer rule comprises a path rule for setting a transmission path in the network for transferring the data incoming over the network to another communication apparatus of the plurality of communication apparatuses.

6. The communication system according to claim 5, wherein the at least one communication apparatus further comprises a plurality of ports from which the data incoming over the network is sent to the network, the plurality of ports correspond to a plurality of transmission paths, and the path rule comprises a rule that identifies one of the plurality of ports based on a sender and a destination of the incoming data.

7. The communication system according to claim 1, wherein the transfer rule comprises a band rule for setting a communication band in which the data is to be transmitted, in a communication band of the network.

8. The communication system according to claim 7, wherein the band rule comprises a rule for securing a communication band for the data, in the communication band of the network.

9. The communication system according to claim 1, wherein the processor is configured with the program such that operation as the rule switching module includes an operation, in response to receiving the notification, to begin a time count based on the synchronized time, and switching the one transfer rule to the another transfer rule when the counted time reaches the time of the notification.

10. A communication apparatus connected to a communication system over a factory automation network for transferring data for controlling a manufacturing apparatus or a production facility, the communication apparatus comprising a communication port configured to be connected to the network, a detector for detecting a potential of the communication port, and a processor configured with a program to perform operations comprising:

operation as a rule storage for storing a plurality of transfer rules for transferring data to another communication apparatus over the network;

operation as a transfer module for transferring data incoming over the network in accordance with one transfer rule of the plurality of transfer rules;

operation as a rule switching module for switching the one transfer rule to another transfer rule in response to the communication apparatus receiving a notification from outside; and operation for detecting change in a network configuration of the network based on a pattern of variation in the potential of the communication port, wherein in response to detecting change in the network configuration, the communication apparatus broadcasts the notification over the network, and switches the one transfer rule to another transfer rule, the communication apparatus and the other communication apparatus are in time synchronization with one another, the notification comprises information on time of switching of the one transfer rule to the other transfer rule, a plurality of communication apparatuses include at least one communication apparatus attached to a robot that is provided as the manufacturing apparatus in the production facility, and the network configuration represents a number or types of the plurality of communication apparatuses connected to network.

11. The communication apparatus according to claim 10, wherein each of the plurality of communication apparatuses connected to the network transfers the data over the network in accordance with a common system cycle.

12. The communication apparatus according to claim 10, wherein the processor is configured with the program such that operation as the rule switching module includes an operation, in response to receiving the notification, to begin a time count based on the synchronized time, and switching the one transfer rule to the another transfer rule when the counted time reaches the time of the notification.

13. A communication method in a communication system in which a plurality of communication apparatuses are connected to a factory automation network for transferring data for controlling a manufacturing apparatus or a production facility, at least one of the plurality of communication apparatuses comprising a communication port configured to be connected to the network and a detector for detecting a potential of the communication port, the communication method comprising, by the at least one of the plurality of communication apparatuses:

transferring data incoming over the network in accordance with one transfer rule of a plurality of transfer rules for transferring data over the network;

switching the one transfer rule to another transfer rule in response to the communication apparatus receiving a notification from outside; and detecting change in a network configuration of the network based on a pattern of variation in the potential of the communication port, wherein in response to detecting change in the network configuration, the at least one of the communication apparatuses broadcasts the notification over the network, and switches to another transfer rule, the plurality of communication apparatuses are in time synchronization with one another, and the notification comprises information on time of switching of the one transfer rule to the other transfer rule, the plurality of communication apparatuses include at least one communication apparatus attached to a robot that is provided as the manufacturing apparatus in the production facility, and the network configuration represents a number or types of the plurality of communication apparatuses connected to the network.

14. The communication method according to claim 13, wherein each of the plurality of communication apparatuses connected to the network transfers the data over the network in accordance with a common system cycle.

15. The communication method according to claim 13, further comprising initiating, in response to receiving the notification, a time count based on the synchronized time, and switching the one transfer rule to another transfer rule when the counted time reaches the time of the notification.

* * * * *